UNITED STATES PATENT OFFICE.

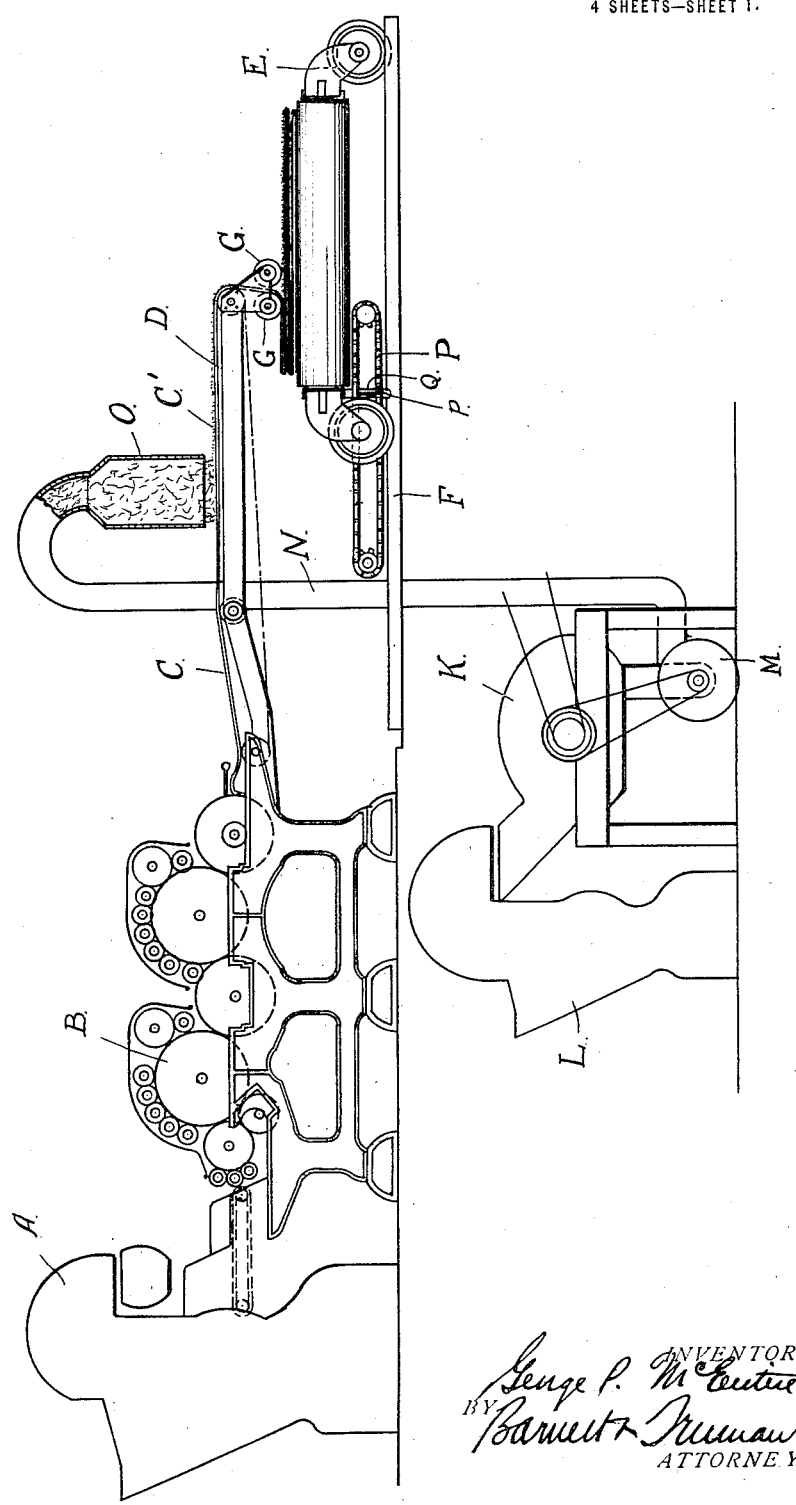

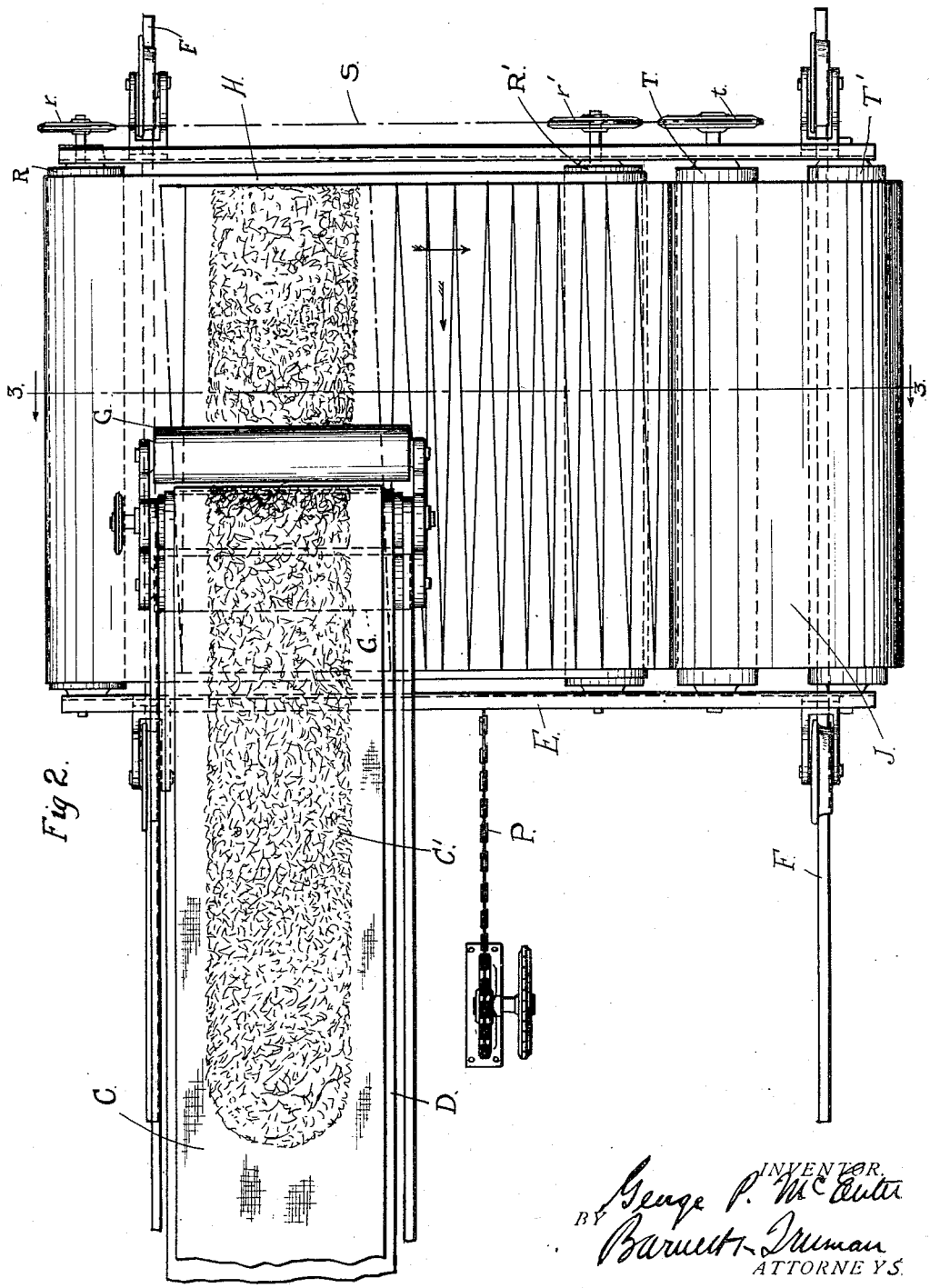

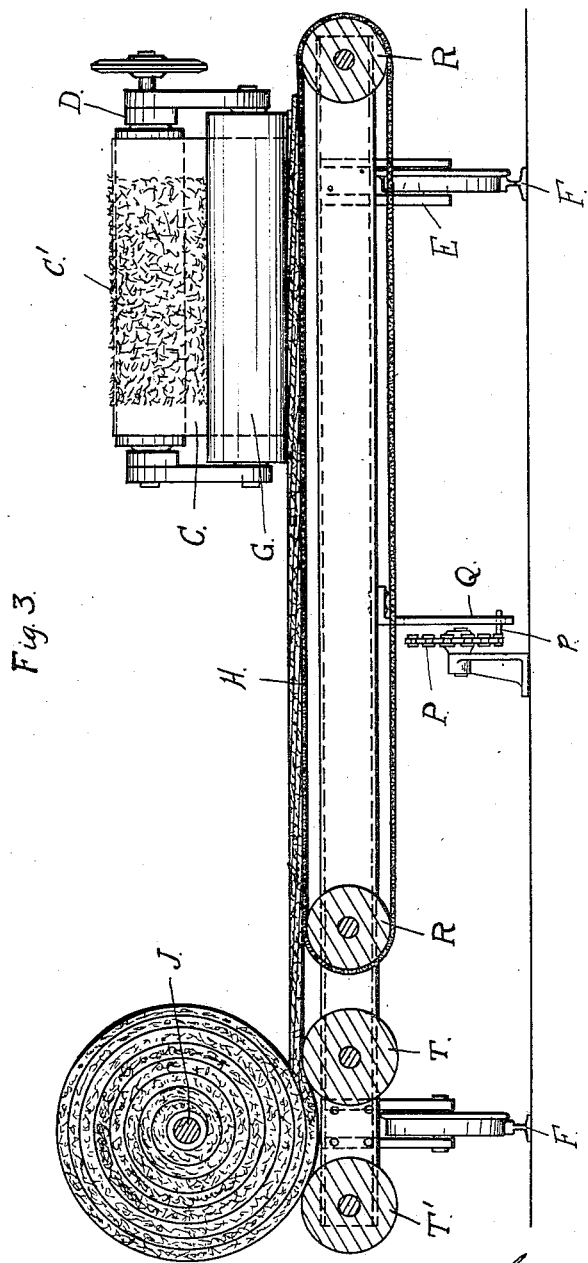

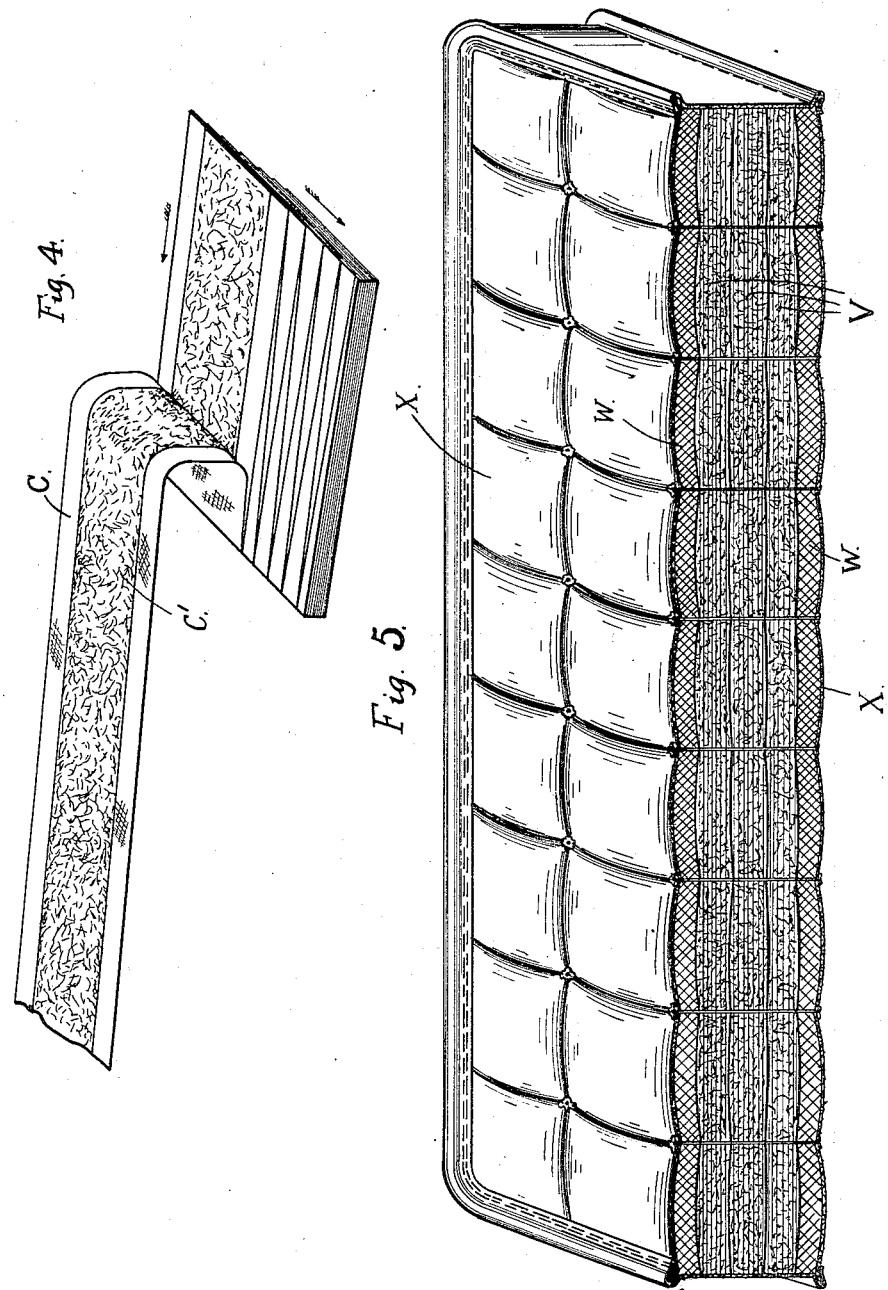

GEORGE POWER McENTIRE, OF TOPEKA, KANSAS.

BATTING AND METHOD OF AND APPARATUS FOR MAKING SAME.

1,297,201. Specification of Letters Patent. Patented Mar. 11, 1919.

Application filed June 25, 1915. Serial No. 36,326.

*To all whom it may concern:*

Be it known that I, GEORGE P. McENTIRE, a citizen of the United States, residing at Topeka, in the county of Shawnee and State of Kansas, have invented certain new and useful Improvements in Batting and Methods of and Apparatus for Making Same, of which the following is a specification.

My invention relates to the manufacture of felted material or batting, such as cotton felt, so-called, used for filling mattresses, cushions, and for other like purposes; and the invention has for its principal objects, first, to provide certain improvements upon the present method of manufacturing batting, of cotton or other like material, whereby the output of a given machine for a given period of time may be increased and whereby it is possible to make use of certain materials, less costly than those customarily employed in this industry, which, because of the nature of the process as heretofore practised, have not been usable in this connection; second, to provide certain apparatus in the nature of an attachment to the ordinary lapping or felting machines for adapting said machines for use in carrying out the improved process; and, third, to provide a novel form of batting which can be produced much more cheaply than the batting heretofore used for filling mattresses and the like, and which, in respect to quality, will be as good, or nearly as good, as the products now in common use.

The invention has for further objects such other improvements in felted materials or batting, and in the methods of and apparatus for manufacturing the same, as will be hereinafter described and claimed.

The invention is illustrated in the accompanying drawings which show a felting or bat making machine of familiar type furnished with means adapting it for producing a bat of a sort contemplated by my invention.

In the drawings,

Figure 1 is a side elevation of the apparatus.

Fig. 2 is a fragmentary plan view of the lapper.

Fig. 3 is a sectional view taken on line 3—3 of Fig. 2.

Fig. 4 is a diagram illustrating the manner in which the web from the carding machine is folded in superposed plies or layers by the lapper; and Fig. 5 is a fragmentary sectional view of a mattress, of preferred type, made up in part from batting manufactured in accordance with my invention.

Like characters of reference designate like parts in the several figures of the drawings.

Referring to the drawings, A designates an automatic feeder by which the feltable cardable fibers, cotton, for example, are fed to the Garnett or carding machine B. The latter produces a thin film or web of felted or carded material C which is carried by an apron D to the lapper which consists of a carriage E movable on a track F in directions to and from the garnett. The web C is fed through rolls G upon a conveyer H on the carriage E. The finished bat is wound in a roll J at the forward side of the carriage E.

The apparatus, so far as just described, is of familiar construction and its operation is well understood. Because of the reciprocatory movements of the carriage E the web C is folded upon itself in a number of slightly oblique or zigzag folds or plies, the thickness of the bat depending upon the speed at which the conveyer H is driven, that is, upon speed at which the folded web on the carriage is carried forward. If the conveyer H is driven slowly in comparison with the velocity of the transverse movements of the carriage, the obliquity of the folds with respect to the length of the bat is slight and the bat will be thick. If the bat is carried forward more rapidly the folds are laid more obliquely and the resulting product is thinner.

The improvement of my invention consists in interposing between each of the superposed folds of the felted web C a certain amount of loose, picked stock C' of one sort or another, which becomes incorporated in and forms a part of the bat; the layers of loose, picked stock being preferably relatively thin so that the superposed layers or webs of felted material will unite one with the other and form a bat having sufficient cohesion so that it may be as conveniently handled as the ordinary cotton batting. The loose, picked stock may consist of any one of a number of different materials. For example, if the felted web is made up of cotton fibers, material of like character may be interposed between the folds of the web. In such case, several advantages accrue, even though I do not obtain the advantage of using cheaper filling material. These advantages are, increased out-put of the machine because of the greater filling capacity of loose cotton as compared with felted cotton of the same weight; a superior resiliency; and an even distribution of loose filling material in such manner that it is securely held in position without additional labor and expense to that end. It is well known that a given weight of cotton is much more compact and has less filling capacity when felted into layers forming cotton batting, and because the felted cotton is more compact, it, of course, has less resiliency. It is also known that if loose, unfelted cotton, or like material, be filled into a mattress, then, although it would take a less weight of cotton to fill the mattress and a greater resiliency is obtained, it is practically impossible to confine the loose cotton, or other filling material, in a uniform mass, but it will work around within the mattress until the mattress is lumpy, thick and hard in spots, and thin and hard in other spots. With my invention the advantages of the felted material and of the loose material are so combined that the loose material may be evenly distributed throughout the body of the cotton bats so that, while to a considerable extent retaining the advantage and economy of greater filling capacity and greater resiliency, each unit of loose filling material is so held in position by the overlying and underlying webs of the cotton bat as to be incorporated in the cotton bat and effectively held against displacement. In other words, I substantially confine each individual particle of loose filling material, thus making it practical to use a large proportion of unfelted cotton or less loose material in the manufacture of a mattress which shall, nevertheless, in service maintain a uniform thickness to substantially or quite the same extent as if filled only with felted cotton, while retaining the advantage of greater resiliency arising from the use of loose material and attaining a greater economy in the quantity of material used, as compared with a mattress filled solely with felted cotton. All this I attain by a method and mechanism which, while lessening the amount of felting work which must be done for a given mattress, or, to state it differently, while increasing the mattress out-put of a given installation, involves no substantial additional expense for machinery and no additional expense for labor.

Instead of using, as a material to be interposed between the felted webs, cotton or other fibers of the quality ordinarily employed for making felt or batting, it is quite possible to use fibers of a cheaper grade, for example, cotton fibers too short to be successfully run through the Garnett machine. Moss can also be used and I have been able to produce a very excellent bat in which finely cut excelsior is distributed between the folds of the felted cotton web. The use of excelsior reduces the cost of the batting very considerably and while the product is not equal in quality to the highest grade of cotton felt, its value as a filling material is very high in proportion to its cost of production. The excelsior, if not used in too large quantities, works its way into the layers of felted cotton between which it is placed and the webs become united or felted one with the other in the usual way so that the product is in the form of a unitary and coherent sheet or bat of material having thereby the well known advantages which mattress-filling material in the form of batting possesses. I have found it possible to make in this way a bat consisting of one-third to one-half of excelsior. The advantage involved in this method of making batting is two-fold: The excelsior is very cheap in comparison with feltable fibers such as the cotton ordinarily used. It is not practicable to introduce excelsior or like material into the Garnett machine and felt it with the cotton as the Garnett is not capable of handling material of this sort. Furthermore, by distributing the picked stock on the felted web before the lapping operation commences, the capacity of the apparatus is very considerably increased, and the excelsior is so incorporated in the body of the bat that no appreciable loss of elasticity results.

The picked stock may be dropped upon the web from the Garnett machine at any suitable point and by means of any suitable apparatus. I have shown at K a picking machine of familiar type into which the raw material is fed by an automatic feeder L and from which the stock when picked is carried to a point above the conveyer D by means of a fan M and pipe N. The latter is provided with an enlarged spout O so that the air pressure is reduced at the discharge end of the pipe. The picked stock is deposited in this manner upon the web C before the lapping operation takes place.

It will be understood that the various movable parts of the lapper may be driven by any suitable mechanism. The carriage E is shown as reciprocated by means of an endless chain P to which it is attached by a slotted arm Q working upon a pin $p$ on the chain. The conveyer H is carried on rollers R, R' provided with pulleys $r$, $r'$ driven by a belt S which extends over the pulley $t$ of a feed roller T. T' is an idle roller.

When the picked stock, which is distributed between the folds of the felted web, is excelsior or other material which might work through the tick of the mattress, or detract possibly from the softness and smoothness of the surfaces of the mattress, in case batting so formed were used throughout the mattress, I prefer to use the batting having the excelsior in it only in the interior of the filling and to cover the same on top and bottom with clear batting, as shown in Fig. 5. In this figure the bulk of the filling of the mattress is made of layers or bats V, constructed as hereinabove described, with excelsior or other non-feltable, relatively cheap material disposed between the folds of the web of cotton felt. Bats W or layers of ordinary cotton felt are placed above and below the main body of the filling V and between the same and the ticking X.

While I have described my invention as applied to the manufacture of a batting composed of cotton felt and loose, picked stock of one sort or another, it would be possible to use in place of the cotton fibers other feltable fibrous materials commonly employed for making mattress fillings such, for example, as wool, flax and kapok. I have described my improved process as it may be practised by means of a familiar type of felting apparatus. It is realized, however, that apparatus considerably different in its structure and mode of operation might be utilized for performing the same or equivalent operations. I do not wish, therefore, to be understood as limiting the invention to the particulars above set forth, which have been set forth for the purpose of illustrating what I consider to be the most efficient and desirable way of utilizing the advantages of the invention, except so far as the claims are expressly limited to said particulars. By describing the material deposited on the carded web as "loose fibrous material", I intend to differentiate the same from the carded fibers which are aggregated in a web or fleece of more or less felt-like character.

I claim:

1. Batting composed of a plurality of superposed single webs of carded fibers and a thin layer of loose fibrous material evenly distributed between each of said carded webs.

2. Batting composed of a plurality of superposed single webs of carded cotton fibers and a thin layer of loose fibrous material evenly distributed between each of said carded webs.

3. Method of making batting which consists in carding fibrous material to form a thin fleece, distributing loose fibrous material thinly over this fleece and then lapping the fleece to form a bat.

4. Method of making batting which consists in carding fibrous material to form a thin fleece of felt-like character, disaggregating fibrous material and conducting the disaggregated material in suspension in air and depositing the same on the web in a thin, evenly distributed layer, and then lapping the fleece to form a bat.

5. Apparatus for manufacturing batting comprising in combination a carding machine to form fibrous material into a thin web, a lapping machine for building up the web to a bat, and means for thinly distributing loose fibrous material on the web formed by the carding machine so that it will be incorporated into the bat by the lapping operation.

6. Apparatus for manufacturing batting comprising a carding machine, a movable apron to receive the carded web from the carding machine, means for distributing loose fibrous material upon the web on the apron, and a lapping machine which receives the web from the apron and builds the same to a bat.

7. Apparatus for manufacturing batting comprising a carding machine, a movable apron to receive the carded web from the carding machine, a picker, a fan and conduit for conducting picked fibrous material from the picker and distributing it upon the web as the latter is moved forward by the apron, and a lapping machine which receives the web from the apron and builds the same to a bat.

GEORGE POWER McENTIRE.

Witnesses:
A. Post,
F. E. Goodrich.